(12) United States Patent
Johnson et al.

(10) Patent No.: US 9,781,874 B2
(45) Date of Patent: Oct. 10, 2017

(54) PRECISION FARMING SYSTEM UTILIZING SEED VENDOR DATA

(71) Applicant: CNH Industrial America LLC, New Holland, PA (US)

(72) Inventors: Blair J. Johnson, Sandwich, IL (US); John Stratton, Denver, CO (US); Andrew Meyer, Prospect Heights, IL (US); Scott Andrew Elkins, Plainfield, IL (US)

(73) Assignee: CNH Industrial America LLC, New Holland, PA (US)

( * ) Notice: Subject to any disclaimer, the term of this patent is extended or adjusted under 35 U.S.C. 154(b) by 0 days.

(21) Appl. No.: 14/923,653

(22) Filed: Oct. 27, 2015

(65) Prior Publication Data

US 2017/0112047 A1    Apr. 27, 2017

(51) Int. Cl.
*A01B 79/00* (2006.01)
*A01C 7/00* (2006.01)
*G06Q 10/06* (2012.01)

(52) U.S. Cl.
CPC .............. *A01B 79/005* (2013.01); *A01C 7/00* (2013.01); *G06Q 10/06315* (2013.01)

(58) Field of Classification Search
CPC ... A01B 79/005; G06Q 10/06315; A01C 7/00
USPC ........................................................ 701/50
See application file for complete search history.

(56) References Cited

U.S. PATENT DOCUMENTS

| 6,070,673 | A | * | 6/2000 | Wendte | G01C 21/20 172/2 |
|---|---|---|---|---|---|
| 6,671,698 | B2 | | 12/2003 | Pickett et al. | |
| 7,975,632 | B2 | | 7/2011 | Gogerty et al. | |
| 8,862,630 | B2 | | 10/2014 | Hunter et al. | |
| 2005/0096849 | A1 | | 5/2005 | Sorrells | |
| 2010/0172502 | A1 | * | 7/2010 | Jones | G06K 17/0029 380/277 |
| 2011/0016144 | A1 | | 1/2011 | Strachan et al. | |
| 2013/0174040 | A1 | | 7/2013 | Johnson | |
| 2013/0185104 | A1 | | 7/2013 | Klavins | |
| 2014/0165891 | A1 | * | 6/2014 | Garner | A01C 7/08 111/170 |
| 2016/0234996 | A1 | * | 8/2016 | Sauder | A01C 21/005 |
| 2016/0302351 | A1 | * | 10/2016 | Schildroth | A01B 79/005 |

OTHER PUBLICATIONS

"Farming in the Face of Climate Change? Monsanto Has an App for That", Tim McDonnell, Nov. 20, 2014 (15 pages).

(Continued)

Primary Examiner — Brian P Sweeney
(74) Attorney, Agent, or Firm — Rickard K. DeMille; Rebecca L. Henkel

(57) ABSTRACT

A method of operating an agricultural implement in a geographic area using data representing at least one attribute associated with seed, includes the steps of:
transferring data including at least one attribute associated with seed to a remote computer which is located remote from the geographic area;
editing the data at the remote computer;
uploading the analyzed data to an electrical processing circuit associated with the implement; and
operating the implement under control of the electrical processing circuit within the geographic area, using the uploaded data.

11 Claims, 3 Drawing Sheets

(56) References Cited

OTHER PUBLICATIONS

"Farming Field Records", David Hest, Farm Industry News, Mar. 1, 2003 (5 pages).
"Precision Agriculture Bears Fruit for Farmers, Generates Profits for Select Companies", Annis Walsgrove, Dec. 19, 2012 (2 pages).

* cited by examiner

PRECISION FARMING SYSTEM UTILIZING SEED VENDOR DATA

BACKGROUND OF THE INVENTION

1. Field of the Invention

The present invention relates to agricultural implements, and, more particularly, to agricultural implements utilizing precision farming techniques.

2. Description of the Related Art

Agricultural planters are commonly used implements to plant seeds in soil. An agricultural planter can include a chassis that carries one or more storage tanks carrying seed, and chemical applications that are to be applied to the field during the planting operation, a hitch mechanism that attaches to a tractor or other implement pulled by a tractor, and a tool bar that row units can be connected to so they are carried by the chassis. The planter can also include a pneumatic system carried by the chassis that supplies pressurized air to transport the seeds or other particulate from the storage tanks to the row units.

Each row unit of the agricultural planter places seeds in the field. Typically, the row units are laterally arranged along a length of the tool bar so that as the planter is pulled across the field, each row unit plants seeds at predefined intervals along the path it is pulled across. To plant seeds, the row units perform four main operations as they are pulled: opening a trench in the soil; placing a seed into the formed trench at appropriate intervals; closing the formed trench to put soil on top of the placed seed; and packing soil on top of the seed to provide desirable soil contact with the placed seed. To open a trench in the soil, a furrowing disc system, which may include an opening disc, cuts into the soil and rotates, dislocating soil as it rotates to form the trench. Once the trench is open, a seed is placed in the trench by a metering device which receives seeds from the main storage tank(s) or a row unit storage tank and typically utilizes a combination of differential air pressure, to select the seed, and gravity to place the seed in the trench at predefined intervals along the pulled path so that adjacent seeds in the row are not too close to one another. One or more closing discs carried behind the furrowing disc are pressed into the soil and also rotate as the planter is pulled to replace soil dislocated by the furrowing disc in the trench or dislocate adjacent soil into the trench to cover the seed placed in the trench with soil. Finally, a pressing wheel carried behind the closing disc(s) exerts pressure on the soil covering the seed to press the soil down onto the seed and provide good soil contact with the seed. By having multiple row units working in unison as the planter is pulled across a field, many seeds can be effectively planted in an efficient manner.

Precision farming systems are widely used with agricultural implements, including planters. In general, a precision farming system or technique uses geospatial data for a given geographic region (e.g., agricultural field, strip or other area) and carries out one or more specified tasks based at least in part on the geospatial data. The geospatial data is usually derived from a global positioning system (GPS) sensor located onboard the vehicle, and the position of the vehicle at least in part triggers various actions or tasks to occur. For example, agricultural vehicles such as planters, sprayers, fertilizer spreaders, etc, can carry out variable rate application of a product to the field based on the geospatial data. The fields can be mapped for soil type, fertility or pH levels, etc, and the GPS data for the current position of the vehicle can trigger different application rates as the vehicle traverses across the field.

What is needed is an improved precision farming arrangement that allows product to be efficiently and cost effectively applied to a field.

SUMMARY OF THE INVENTION

The present invention allows data representing at least one attribute associated with seed to be transferred to a remote computer, edited by a user, and uploaded to a precision farming system for use during a farming operation.

The invention in one form is directed to a method of operating an agricultural implement in a geographic area using data representing at least one attribute associated with seed. The method includes the steps of:

transferring data including at least one attribute associated with seed to a remote computer which is located remote from the geographic area;

editing the data at the remote computer;

uploading the analyzed data to an electrical processing circuit associated with the implement; and operating the implement under control of the electrical processing circuit within the geographic area, using the uploaded data.

An advantage of the present invention is that data corresponding to a particular seed is uploaded to a remote computer where it can be edited by a user offline while not farming, then uploaded into the precision farming system associated with an implement and used during a farming operation.

Another advantage is that the seed related data can be carried over and used from one farming operation to another, such as planting and spraying.

BRIEF DESCRIPTION OF THE DRAWINGS

The above-mentioned and other features and advantages of this invention, and the manner of attaining them, will become more apparent and the invention will be better understood by reference to the following description of embodiments of the invention taken in conjunction with the accompanying drawings, wherein.

Corresponding reference characters indicate corresponding parts throughout the several views. The exemplifications set out herein illustrate embodiments of the invention, and such exemplifications are not to be construed as limiting the scope of the invention in any manner.

DETAILED DESCRIPTION OF THE INVENTION

Figure 1:
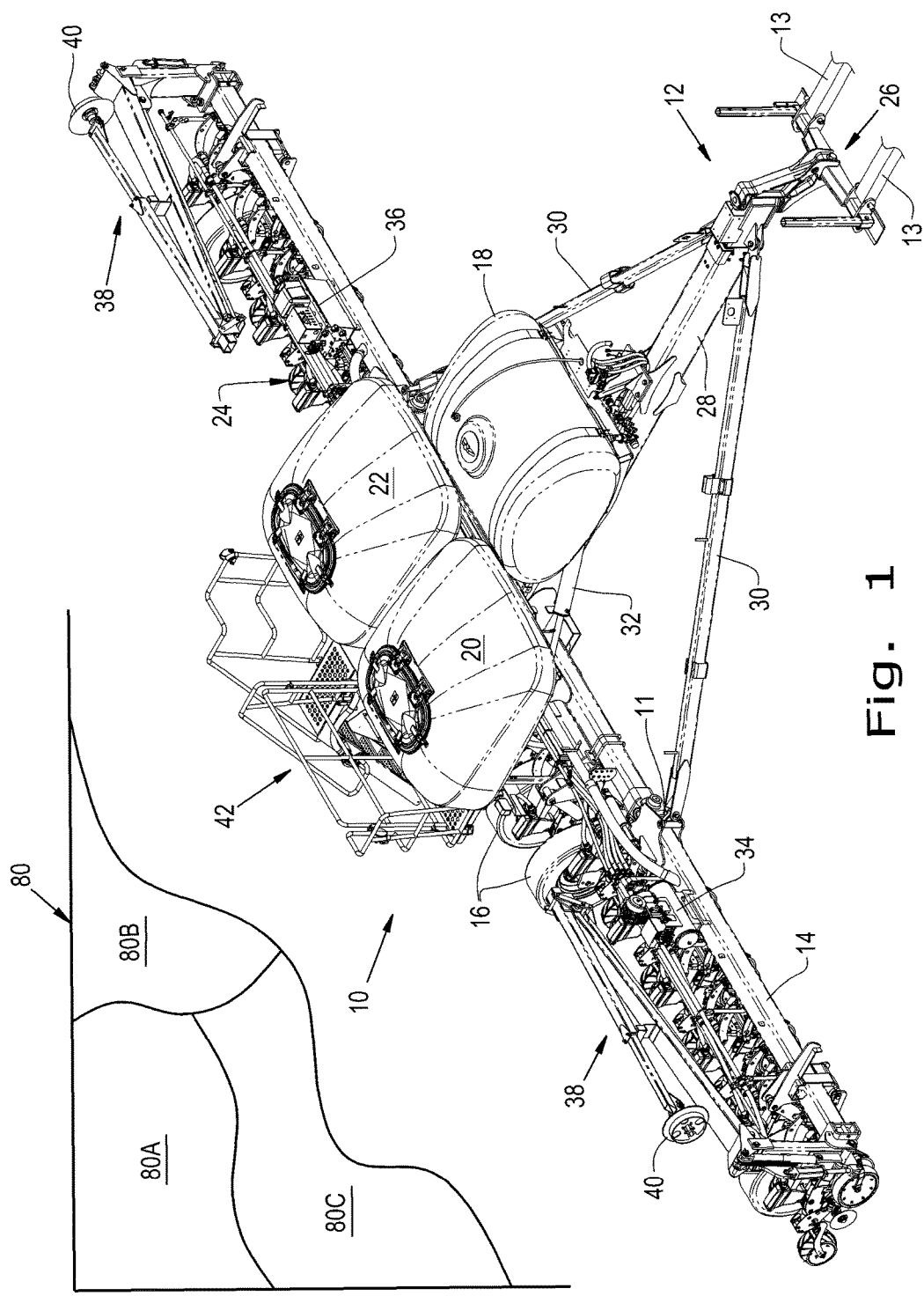
FIG. 1 is a perspective view of an agricultural implement in the form of a planter, shown traversing over a geographic area such as a field.

Referring now to the drawings, and more particularly to FIG. 1, there is shown an embodiment of an agricultural implement in the form of a planter 10, which generally includes a chassis 11 forming a support structure for components of the planter 10. The planter 10 can include a hitch assembly 12 at a front of the planter 10 connected to a tool bar 14 to form the chassis 11, main wheels 16 carried by the chassis 11 near a rear of the planter 10, one or more storage tanks 18, 20, 22 carried by the chassis 11 that can be filled with seed or other agriculture material, and a plurality of row units 24 connected to the tool bar 14 and arranged laterally across a length of the tool bar 14 so that they are carried by the chassis. The hitch assembly 12 can include a hitch 26 configured to be connected to a two vehicle in the form of a tractor 13 (shown partially) or other agricultural implement (not shown) so that the planter 10 can be pulled in a forward direction of travel. The hitch 26 can be integrally formed with or connected to a hitch bar 94 that is connected to the tool bar 14 by bracing bars 30 and one or more cylinders 32. As can be seen throughout FIG. 1, the planter 10 can also have various hydraulic, pneumatic, and electrical lines (unnumbered) throughout to support various cylinders and systems that are included on the planter 10, such as a pneumatic system 34 connected to the tool bar 16 and an electric generator 36 also connected to the tool bar 16. A marking device 38 can be connected to each lateral end of the tool bar 14 and extendable so that a marking disc 40 of the marking device 38 can create a line in the soil as the planter 10 is pulled that helps a user in positioning the planter 10 to create subsequent rows. A stair assembly 42 can be mounted to the back of the planter 10 to allow an operator to access the storage tanks 20 and 22. Various actuators (not shown) onboard the planter 10 (or other implement, such as a sprayer, etc.) are used to apply the product at known application rates under control of electronic controller 86.

Figure 2:
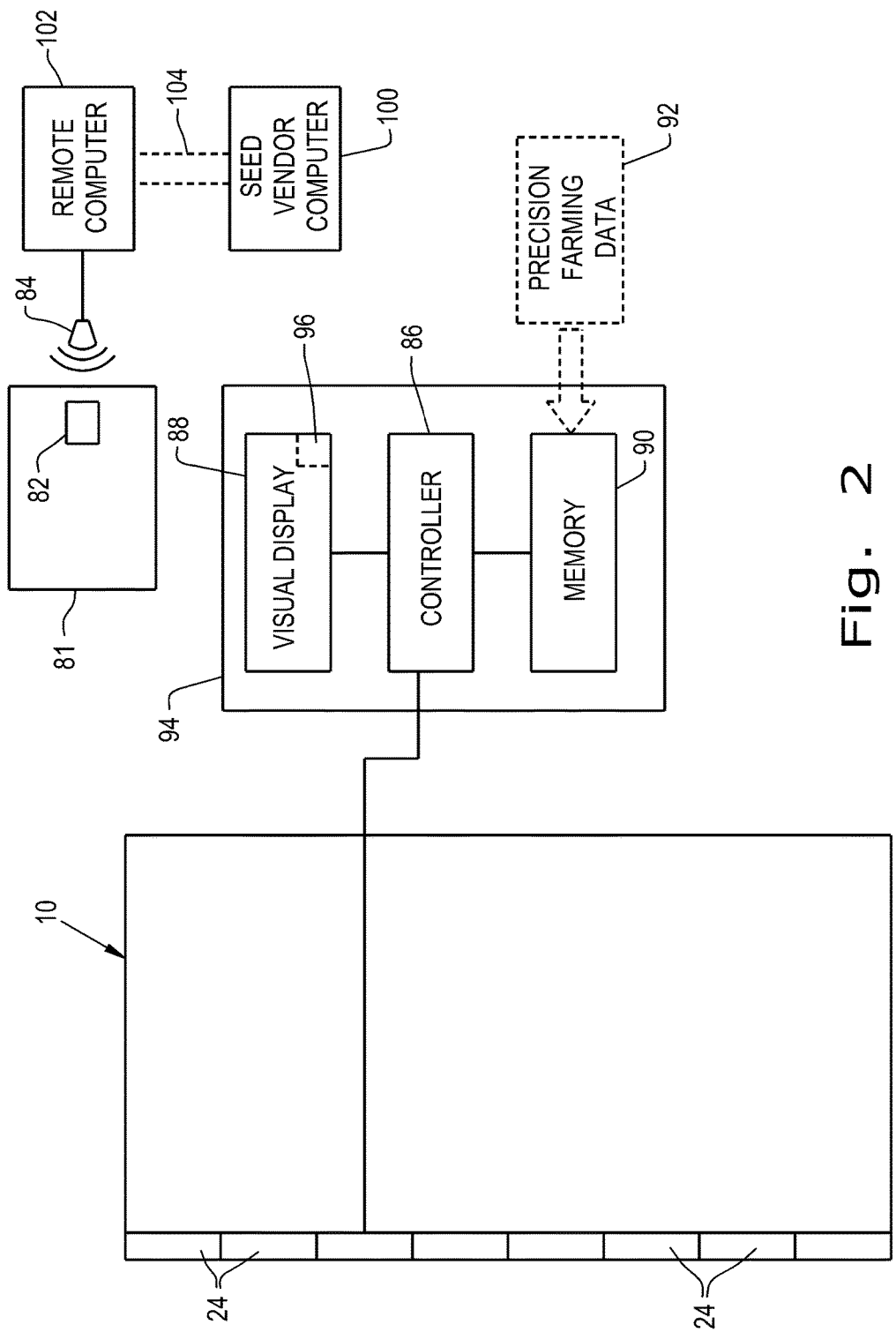
FIG. 2 is a schematic view of an embodiment of a portion of a tow vehicle and an agricultural implement in the form of an agricultural planter, which can be used to carry out the method of the present invention.

Referring now to FIG. 2, there is shown a schematic illustration of the agricultural planter 10 for seeding within a geographic area, such as all or a portion of field 80 shown in FIG. 1. According to an aspect of the present invention, agricultural seed or seed applicant information can be stored, edited and utilized throughout the planting, spraying and/or other farming operations. To that end, seed vendor data (e.g., from a seed vendor computer 100) representing one or more attributes of the seed can be transferred to a remote computer 102, such as over an internet connection 104, edited by a user at the remote computer 102, and then uploaded to an electrical processing circuit 86 associated with the planter 10 for subsequent use during farming operations. The seed vendor data can include data representing an attribute of the seed purchased by the user/farmer/agronomist. For example, the seed vendor data can include data representing a manufacturer, product number, suggested population rate, total number of seeds per bag, active ingredients within the bag, inert ingredients within the bag, etc. Other types of data representing attributes associated with the seed may also be possible.

Located within operator cab 94 are an electrical processing circuit 86, a visual display 88 and a memory 90. Visual display 88 is coupled with electrical processing circuit 86 and provides a visual display to an operator located within operator cab 94. Visual display 88 can display a number of different types of visual information, including seed vendor data associated with the seed. Visual display 88 may be any suitable type of display, such as an LED display, LCD display, etc.

Memory 90 likewise is coupled with electronic controller 86 and may be any suitable type of memory, such as a static or dynamic memory. Memory 90 may include any type of relevant data, including precision farming data which may be generated by the operator or obtained from a number of different commercial sources (represented by the dashed box 92). Such data can be uploaded to memory 90 using any suitable technique, such as a direct wired or wireless upload, wireless Internet upload, satellite upload, etc. The precision farming data may be of different data types, such as a topographical map of the geographic area; at least one soil type associated with the geographic area; at least one application rate of the active ingredient associated with the geographic area; at least one fertility level of soil associated with the geographic area; and at least one pH level of soil associated with the geographic area. For purposes of illustration, a portion of a topographical map for a field 80, including soil types 80A, 80B and 80C is shown in FIG. 1.

Electrical processing circuit 86 is shown as a digital electronic controller in FIG. 2, but could also be configured as an analog type processing circuit. Electronic controller 86 receives precision farming data from memory 90 associated with the geographic area represented by field 80. Electronic controller 86 matches the seed vendor data with the precision farming data to establish one or more seeding or application rates over at least a portion of field 80. For example, when planting, the application rate can be a population rate of the seed within the different soil types 80A, 80B and 80C within the field 80. If the seed information is carried over to subsequent farming operations such as spraying, the application rate can be an application rate of a herbicide for different soil types 80A, 80B and 80C within field 80.

As shown in FIG. 1, a field 80 can include multiple soil types 80A, 80B and 80C. By automatically matching the seed vendor data with the precision farming data, electronic controller 86 can vary the application rate from one soil type to another as the planter 10 (or sprayer, etc.) moves across field 80. An operator can optionally be prompted on visual display 88 to accept the application rates based on the matched data, or can manually enter another application rate(s) by overriding the application rates based on the match data.

Figure 3:
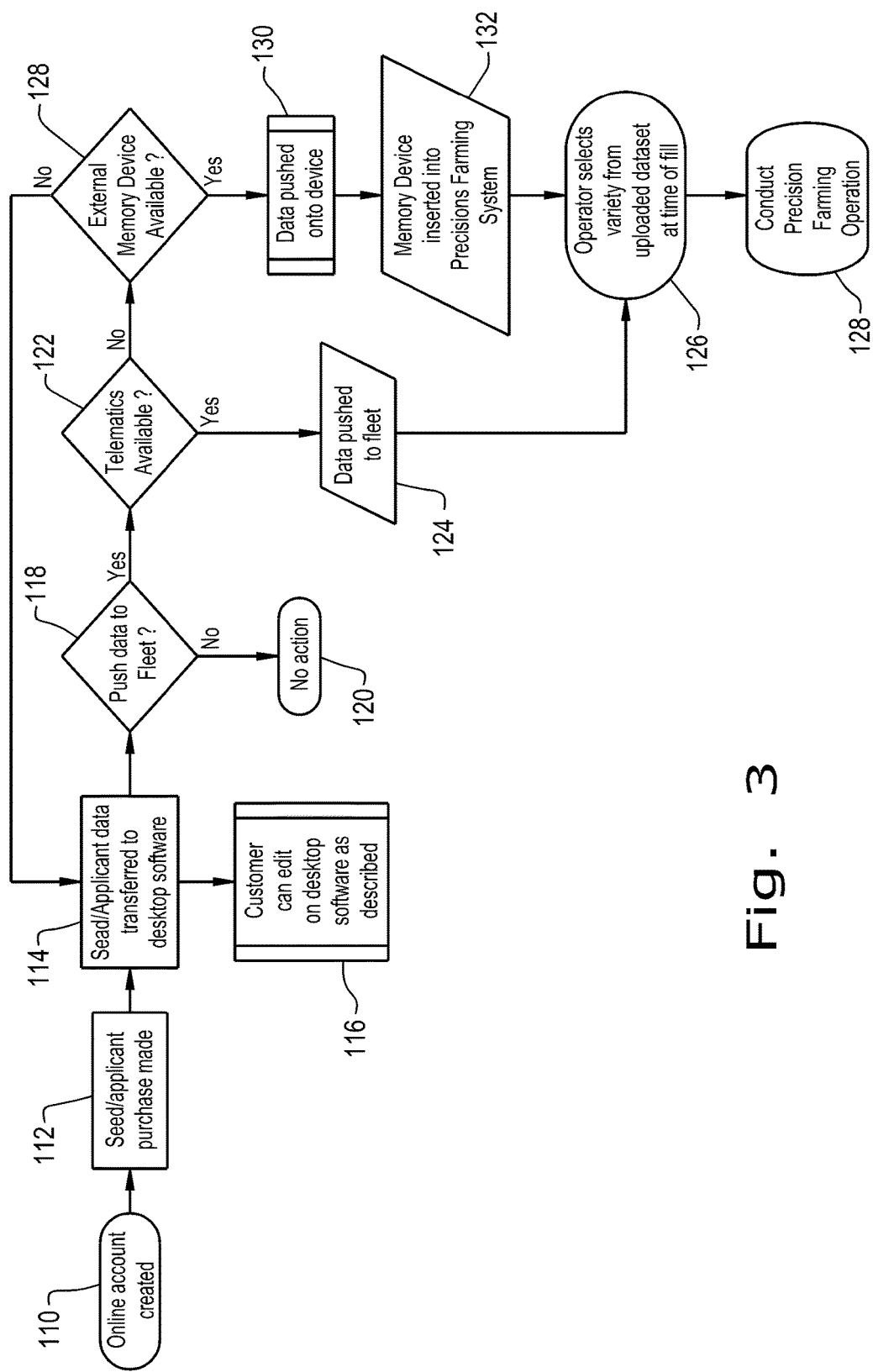
FIG. 3 is a flowchart of an embodiment of a method of the present invention for seeding within a geographic area.

More specifically, and referring now to FIG. 3, the seed vendor data can be transferred to the remote computer stored in the memory 90 in a number of ways. For example, a potential purchaser of seed can create an online account with the seed vendor (e.g., seed company or seed dealer, block 110). Upon completion of a seed purchase (block 112), the seed vendor data can be transferred to the remote computer 102 via the internet using desktop software on the remote computer 102 (block 114). The user/farmer/agronomist can then edit the seed vendor data offline from the farming operation (block 116). For example, the user/farmer/agronomist can view, manipulate, sort, select, calculate and/or store the seed vendor data using the remote computer.

At decision block 118, a determination is made as to whether the edited seed vendor data should be pushed to a vehicle or fleet of vehicles associated with a farming operation. If the answer is NO, then no action occurs (block 120). On the other hand, if the answer is YES, then a determination is made as to whether telematics are available, which typically means that a wireless connection of some type is available (e.g., wireless internet, mobile phone connection, etc; block 122). If telematics are available, then the edited seed vendor data is pushed to the vehicle or fleet of vehicles (block 124), and the operator can use the seed vendor data during the farming operation (block 126).

On the other hand, if telematics are not available, then an external memory device (such as a flash drive, SD card, etc.) can be used to upload the edited seed vendor data to the precision farming system associated with the farming operation (decision block 128). The edited seed vendor data can be saved to the external memory device from the remote computer 102 (block 130), and subsequently uploaded to the precision farming system (block 132). The operator can then use the seed vendor data during the farming operation (blocks 126 and 128).

The edited seed vendor data can be uploaded and displayed on the display 88 for viewing by an operator. Using initial volumes of product, known application rates, etc. the operator can be alerted when product becomes low in one or more product containers (such as hoppers, bulk tanks, etc.)

In the embodiment described above, the data representing at least one seed attribute is transmitted to the remote computer 102 from a seed vendor computer 100, such as through an internet connection 104. However, it is also possible to transmit the data representing at least one seed attribute to the remote computer 102 in other ways. For example, an ID tag 82 can be attached or otherwise affixed to a container of seed 81 and automatically read using an appropriate reader 84 (FIG. 2). The container of seed 81 is assumed be a bag of seed in the illustrated embodiment, but could be another suitable type of container, such as a bulk seed hopper or the like.

ID tag 82 is shown positioned toward an end of the bag of seed 81 but can be positioned at any suitable location allowing automated reading thereof. ID tag 82 can be any type of tag which can be read in an automated manner, such as a radio frequency identification (RFID) tag, barcode, Quick Response (QR) code, etc. In the illustrated embodiment, ID tag 82 is assumed to be in the form of a tag with a barcode.

Barcodes are well known for many different purposes, and basically include a number of parallel bars of varying thickness, providing a 1 dimensional code when read by a suitable reader. QR codes are similar to bar codes, but provide a 2 dimensional code when read by a suitable reader. Radio frequency identification (RFID) tags are well known throughout industry, and are being increasingly utilized for supply chain management, inventory management, and logistic control. These tags can be written to and read from a handheld transceiver (referred to as an RFID reader) or fixed portal. For example, an RFID tag can be placed upon a shipping container and contain data corresponding to the contents of the shipping container. The RFID tag can be read using a handheld reader or a portal reader, and the data offloaded from the reader to a computer for processing.

ID tag 82 includes data representing an attribute of the seed within the bag of seed 81. For example, ID tag 82 can include data representing a manufacturer, product number, suggested population rate, total number of seeds per bag, active ingredients within the bag, inert ingredients within the bag, etc. Other types of data representing attributes associated with the seed may also be possible.

Electronic controller 86 can be coupled with a reader 84, either wired or wireless, and receives output signals from reader 84 representing data associated with the seed within the bag of seed 81. Electronic controller 86 controls operation of reader 84 to read ID tag 82 either automatically or on command. For manual or "on command" reading of ID tag 82, and operator within operator cab 94 can manually depress a switch or button, such as a virtual button 96 on visual display 88. A corresponding output signal is provided from visual display 88 to electronic controller 86, which in turn effects the read operation of ID tag 82 using reader 84.

Reader 84 can be a barcode reader if ID tag 82 is configured as a barcode. For some applications, reader 84 can be a handheld reader providing a wired or wireless output signal to the electrical processing circuit 86. In the event that the ID tag 82 is an RFID tag, then the reader 84 can be handheld, or carried directly or indirectly by chassis 11 and positioned at a suitable location allowing automated reading of ID tag 82. For example, reader 84 can be in the form of an RFID portal reader which is positioned at a suitable location onboard the planter 10.

While this invention has been described with respect to at least one embodiment, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

What is claimed is:

1. A method of operating an agricultural implement in a geographic area using data representing at least one attribute associated with seed, the method comprising the steps of:
    transferring data including at least one attribute associated with seed to a remote computer which is located remote from the geographic area;
    editing the data at the remote computer;
    uploading the analyzed data to an electrical processing circuit associated with the implement, wherein said electrical processing circuit includes precision farming data associated with the geographic area;
    matching said data associated with said seed with the precision farming data to establish a first application rate of the seed over a first portion of the geographic area and a second application rate of the seed over a second portion of the geographic area; and
    operating the implement under control of the electrical processing circuit within the geographic area, using the uploaded data and the first and second application rates.

2. The method of operating an agricultural implement of claim 1, wherein the editing step includes at least one of viewing, manipulating, sorting, selecting, calculating, and storing the data.

3. The method of operating an agricultural implement of claim 1, wherein the uploading step comprises:
    wirelessly uploading the edited data to the electrical processing circuit; and
    transferring the edited data from a static memory to the electrical processing circuit.

4. The method of operating an agricultural implement of claim 3, wherein the electrical processing circuit includes a memory, and the uploading step includes uploading the edited data to the memory.

5. The method of operating an agricultural implement of claim 1, wherein the electrical processing circuit is located onboard a vehicle which tows the implement.

6. The method of operating an agricultural implement of claim 1, including the further steps of:
    creating an online account with a seed provider; and
    purchasing seed online;
    and wherein the transferring step includes transferring the data to the remote computer upon completion of the purchasing step.

7. The method of operating an agricultural implement of claim 1, wherein the method further includes, prior to the uploading step:
    reading an ID tag affixed to a container of seed, the ID tag including the data.

8. The method of operating an agricultural implement of claim 1, wherein the data representing at least one attribute of the seed comprises at least one of:
    a manufacturer;

a product number;
a suggested population rate;
a total number of seeds per bag; and
inert ingredients within the bag.

9. The method of operating an agricultural implement of claim 7, wherein said ID tag is one of a radio frequency identification (RFID) tag, a bar code, and a quick response (QR) code.

10. The method of operating an agricultural implement of claim 1, wherein said electrical processing circuit carries out the step of matching the data associated with the seed with precision farming data to establish the first and second application rates.

11. The method of operating an agricultural implement of claim 1, wherein the agricultural implement is a planter.

* * * * *